TELEVISION SYSTEM WITH HARD COPY PRINTER

Filed May 7, 1965

INVENTOR
EDWARD L. BYER
BY Hood, Gust & Irish
ATTORNEYS

INVENTOR
EDWARD L. BYER
BY Hood, Gust & Irish
ATTORNEYS

INVENTOR
EDWARD L. BYER
BY Hood, Gust & Irish
ATTORNEYS

INVENTOR
EDWARD L. BYER
BY Hood, Gust & Irish
ATTORNEYS

INVENTOR
EDWARD L. BYER
BY Hood, Gust & Irish
ATTORNEYS

INVENTOR
EDWARD L. BYER
BY Hood, Gust & Irish
ATTORNEYS

United States Patent Office 3,422,218
Patented Jan. 14, 1969

3,422,218

TELEVISION SYSTEM WITH HARD COPY PRINTER

Edward L. Byer, Fort Wayne, Ind., assignor to International Telephone and Telegraph Corporation, Nutley, N.J., a corporation of Maryland Filed May 7, 1965, Ser. No. 454,038
U.S. Cl. 178—6.6 22 Claims
Int. Cl. H04n 5/76; H04n 5/84

ABSTRACT OF THE DISCLOSURE

A television system provides printed copies of an image stored on a direct viewing storage display tube screen. The display screen image is projected onto a sheet of optical image-sensitive material moving in view of the screen and may also be viewed directly. The image display and movement of the sheet are selectively interrupted to permit printing of the image on the immobile sheet. A plurality of copies of the same image are provided during successive interruptions.

This invention relates generally to television systems, and more particularly, to a television system for transmitting still images and including apparatus for providing hard copies of the received image.

There are numerous incidences where it is desired to transmit a still picture rapidly, either from previously prepared flat copy, such as printed or written documents, photographs, drawings, and the like, or from a "snapshot" from a moving screen such as in news picture gathering, traffic control, and the like. Conventional closed circuit television systems have been employed for this purpose; however, a wideband transmission facility such as a coaxial cable or a microwave link is required. Conventional facsimile systems have also been employed for the transmission of previously prepared flat copy pictures; however, such systems are restricted to flat copy of limited size and the transmission of a single picture requires appreciable time, i.e., ordinarily from three to ten minutes. Furthermore, a facsimile system is not capable of instantaneously transmitting a still picture from a moving scene.

It is further frequently desirable that single or multiple hard copies, i.e., prints, be provided of the received picture. Facsimile systems do provide a single hard copy; however, the provision of multiple copies would require multiple time-consuming transmission, or, alternatively, time-consuming reproduction of the original hard copy. The displayed picture on the cathode ray tube of a closed circuit television system may be photographed; however, this requires development and further time-consuming operations to provide multiple copies.

Electrostatic printing techniques lend themselves to the economical production of multiple hard copies and the displayed picture on a conventional cathode ray tube of a closed circuit television system could be projected onto electrostatic paper. However, although electrostatic printing paper is much more sensitive than conventional silver halide office copier papers, it still has a relatively low sensitivity and would require, at presently obtainable cathode ray tube brightness levels, an exposure time of thirty seconds or more. Thus, the provision of a single hard copy of a displayed picture on a conventional cathode ray tube would require the integration of one thousand to two thousand interlaced television frames and because of the large number of frames and jitter, noise, etc., in each frame, a considerable reduction in the quality of the hard copy print over that of the displayed picture would occur. Furthermore, and importantly, there is no storage in conventional closed circuit television systems and thus, in such a system the camera would be required to view the copy being transmitted for the entire time required for the exposure of each hard copy. Thus, since copying would be on-line, i.e., with the cathode ray tube directly coupled to the camera, the camera and transmission facility would be tied up for the full period required for making the requisite number of multiple copies.

In addition to the foregoing considerations, it is frequently desirable that a television system for transmitting still pictures be capable of operation over ordinary voice-band telephone lines and a number of slow-scan television systems have been proposed for this purpose. If a conventional cathode ray tube is employed in such a slow-scan television system in which ten to forty seconds are required for transmitting a single frame, projection of one thousand to two thousand frames required for exposure of electrostatic paper would occupy a wholly unacceptable period of time on the telephone line.

It is therefore desirable to provide a television system for transmitting still pictures capable of operation over ordinary voice-band telephone lines and including apparatus for rapidly and automatically providing single or multiple hard copies of the received picture off-line, i.e., the first print and all additional prints being made after transmission has been completed.

A slow-scan television system for transmitting still pictures over ordinary voice-band telephone lines has been provided under the trademark Videx by the assignee of the present application. In that system, which is more fully described and illustrated in application Ser. No. 246,103 of Nelson E. Hoag, filed Dec. 20, 1962, now U.S. Patent No. 3,251,937, a single frame video signal is generated at slow-scan parameters in response to each picture to be transmitted, this single frame video signal being written into a direct viewing storage display tube. Such tubes, such as number FW 245, manufactured by the assignee of the present application, provide storage of the received image for an indefinite period following termination of transmission and provide continuous viewing of from four to six minutes. The direct viewing storage display tube thus provides the composite functions of buffer storage, direct volatile display of the received image for extended viewing following termination of transmission, a photo source for electrostatic printing of hard copies of the received picture, and as an image source for remote display of the received information. Importantly, by reason of the storage capability of such tubes, multiple copy printing can be accomplished off-line, i.e., after termination of transmission of a single frame video signal and after or while the image is being viewed. In this system, since the direct viewing storage display tube has had one frame written into storage for each picture transmission and the storage and display is thus of a single transmission, all electrostatic copies are of equal quality. Furthermore, direct viewing storage display tubes, such as the FW 245, contain a rectilinear storage screen mesh system which shapes the resolution elements to a more nearly square area rather than a circular area, thus providing greater information transfer efficiency. Additionally, in conventional cathode ray display tubes, the scanning lines are clearly separated and are discernible when the display is viewed. In direct viewing storage display tubes, on the other hand, while the scanning lines are discernible as the information is written into storage, upon subsequent display the scanning lines immediately begin merging and melding into a uniform display which, when either viewed directly or projected onto image-sensitive paper, produces an image of uniform quality without discernible scanning lines.

It is accordingly an object of the present invention to provide a television system for transmitting still pictures incorporating improved apparatus for making a hard copy of the received picture.

Another object of the invention is to provide a television system for transmitting still pictures incorporating improved apparatus for automatically making multiple hard copies of the received picture.

A further object of the present invention is to provide a television system for transmitting still pictures incorporating improved apparatus for automatically making single or multiple hard copies of the received picture off-line.

In accordance with the broader aspects of the invention, a receiving station for a still picture television system is provided incorporating a direct viewing storage cathode ray tube. Means are provded for moving a sheet of optical image-sensitive material from a first location to a third location through a second location intermediate the first and third locations and in the field of view of the output optical image on the display screen of the storage tube. Means are provided for interrupting the output optical image on the storage tube during movement of the sheet and means are provided for interrupting movement of the sheet of image-sensitive material at the second location for a predetermined time so that the output optical image is exposed thereto to provide a latent image thereon corresponding to the output optical image. Means are provided to develop the latent image on the image-sensitive sheet to render the same visible thereby to provide a hard copy of the output optical image on the storage tube.

The above-mentioned and other features and objects of this invention and the manner of attaining them will become more apparent and the invention itself will be best understood by reference to the following description of an embodiment of the invention taken in conjunction with the accompanying drawings, wherein.

Figure 1:
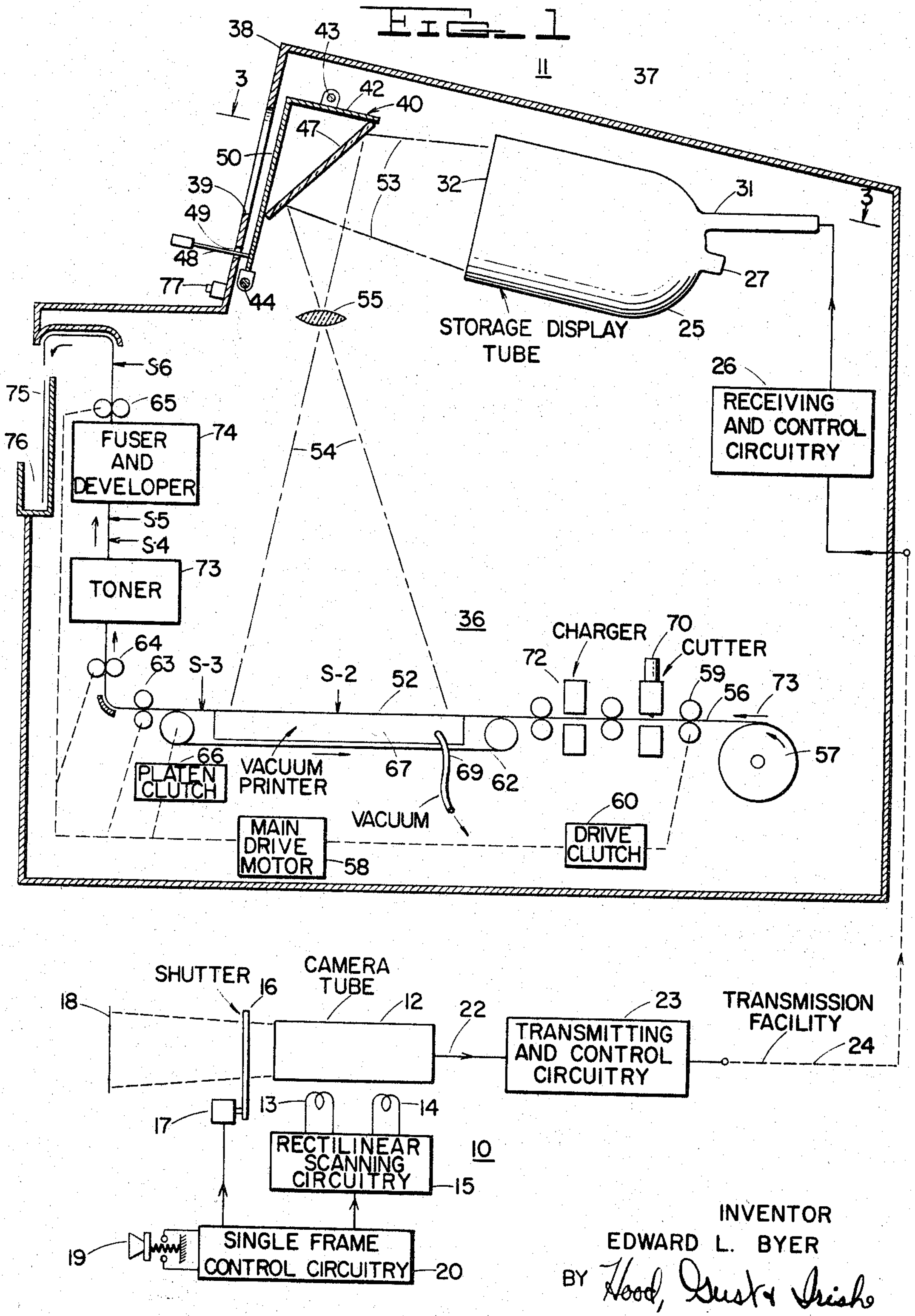
FIG. 1 is a schematic diagram illustrating a television system for transmitting still pictures incorporating one embodiment of the hard copy printing apparatus of the invention showing the mirror positioned to reflect the displayed image onto the electrostatic printing paper.

Referring now to FIG. 1, there is shown a television system for transmitting still images comprising a camera station 10 and a receiving station 11. Camera station 10 comprises a conventional camera tube 12, such as a vidicon tube WL 7290. Camera tube 12 is provided with conventional vertical and horizontal deflection yokes 13, 14 coupled to conventional rectilinear scanning circuitry 15. A suitable mechanical shutter 16 actuated by a suitable solenoid 17 is disposed normally to cut off the view of camera tube 12 of the subject 18 to be transmitted. A transmit button 19 is provided coupled to energize appropriate single frame control circuitry 20. Control circuitry 20 is coupled to actuate scanning circuitry 15 and shutter solenoid 17 to open the shutter 16 to expose the copy 18 to camera tube 12 and to initiate scanning of one frame. When storage of the image on the target electrode of the camera tube has been completed, solenoid 17 is deenergized thereby to close the shutter 16, and scanning of one frame is initiated with the result that a video signal for one frame is provided in output circuit 22 of camera tube 12. Output circuit 22 is coupled to suitable transmitting and control circuitry 23 which, in turn, is coupled to a suitable transmission faciilty 24. In applications in which it is desired that the transmission facility 24 be an ordinary voiceband telephone line, the camera station 10 may be of the slow-scan type as described and illustrated in the aforesaid application Ser. No. 246,103.

At the receiving station 11, a conventional direct viewing storage display tube 25 is provided, which may be a tube manufactured by the assignee of the present application under the trademark Iatron No. FW 245. Display tube 25 is coupled to appropriate receiving and control circuitry 26 which, in turn, is coupled to the transmission facility 24 to receive the single frame video signals therefrom.

Figure 4:
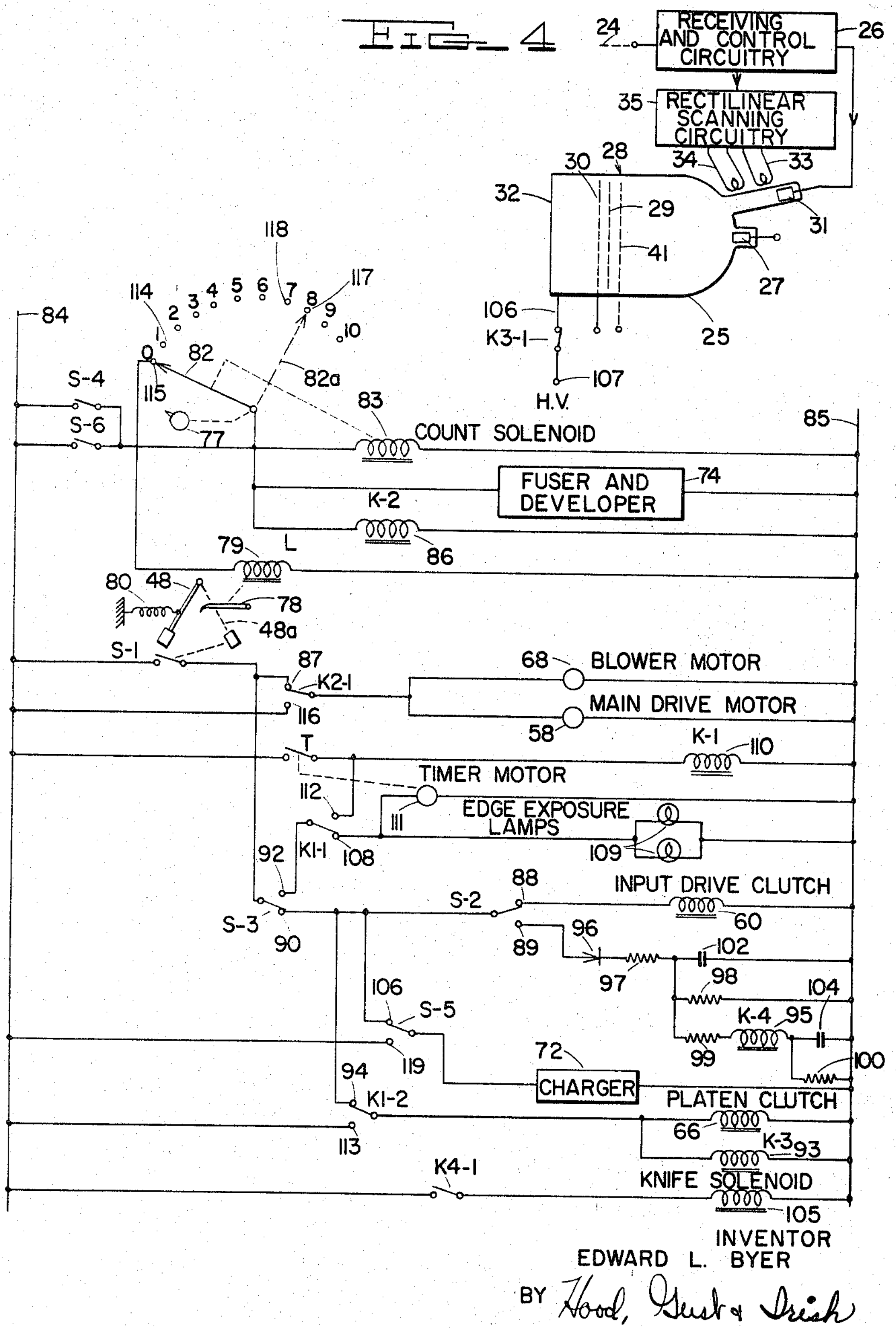
FIG. 4 is a schematic diagram of the control circuitry for the hard copy printing apparatus of FIG. 1.
Figure 5:
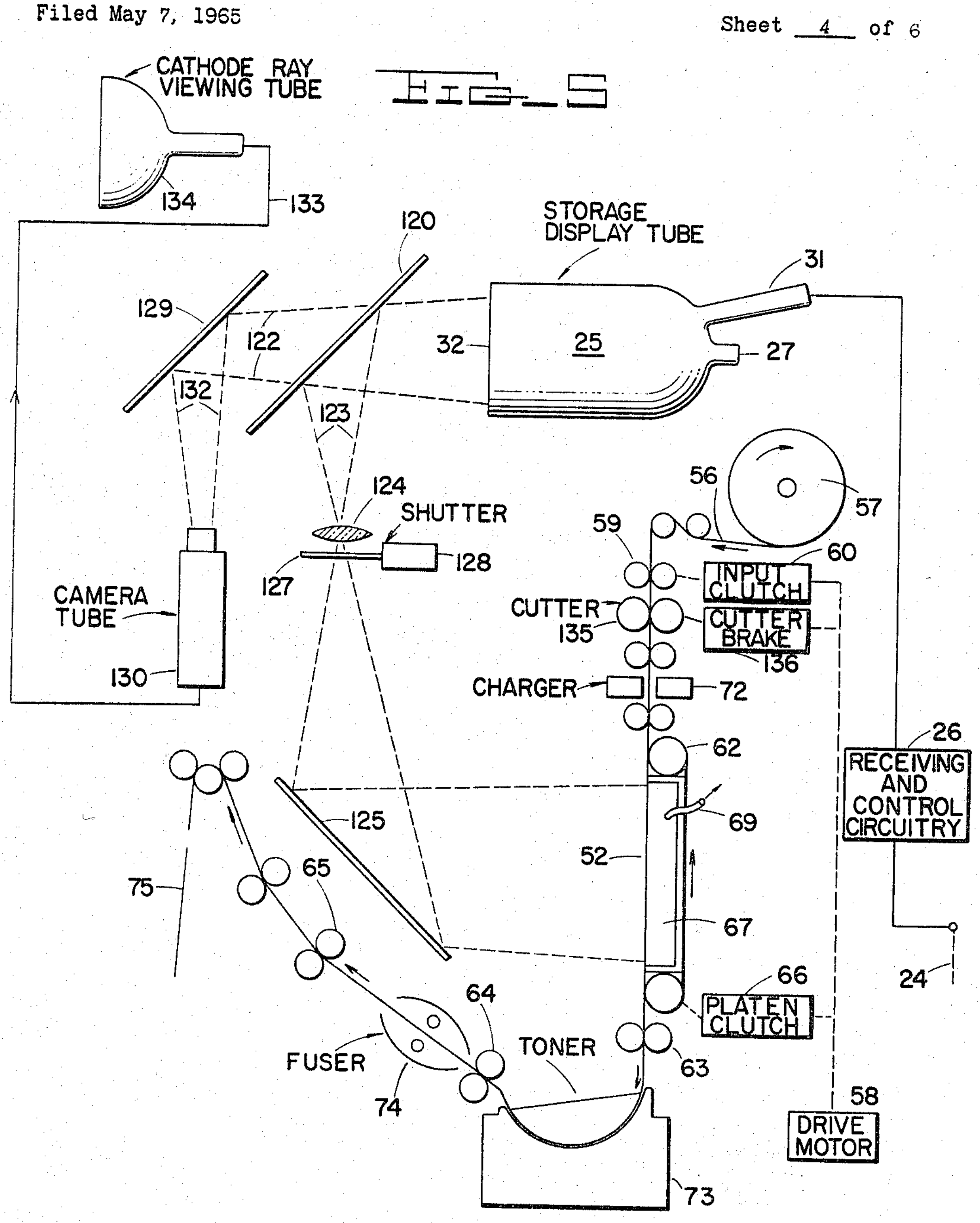
FIG. 5 is a schematic diagram of another embodiment of the hard copy printing apparatus of the invention.

Referring additionally to FIG. 4, display tube 25 comprises a writing electron gun 31, a flood electron gun 27, a storage electrode assembly 28 comprising an insulator screen 29 facing the writing and flood guns 31, 27 and a conductive backing screen 30, a collector screen 41 to remove secondary emission electrons, and a phosphor display screen 32. The writing electron gun 31 forms and directs a high velocity pencil writing electron beam toward the storage electrode assembly 28, the writing beam being modulated by the single frame video signal from the receiving and control circuitry 26. The thus-modulated writing beam is rectilinearly scanned over the insulator screen 29 by means of conventional vertical and horizontal deflection yokes 33, 34 coupled to conventional scanning circuitry 35 which, in turn, is coupled to the receiving and control circuitry 26. Impingement of the modulated writing beam upon the insulator screen 29 of the storage electrode assembly 28 provides a charge pattern thereon by secondary emission corresponding to the optical image of the copy 18 impressed upon the target electrode of the camera tube 12. This charge image on the insulator screen 29 of the storage electrode assembly 28 will remain indefinitely in the absence of a flood electron beam provided by the flood gun 27. Flood gun 27 provides a low velocity flood electron beam which is directed toward and completely covers storage electrode assembly 28. The low velocity electrons of the flood beam pass through the apertures in the storage electrode assembly 28, being modulated by the incremental charges thereon forming the charge image, and thus provide an optical image on the phosphor display screen 32 corresponding to the charge image on the insulator screen 29.

Figure 2:
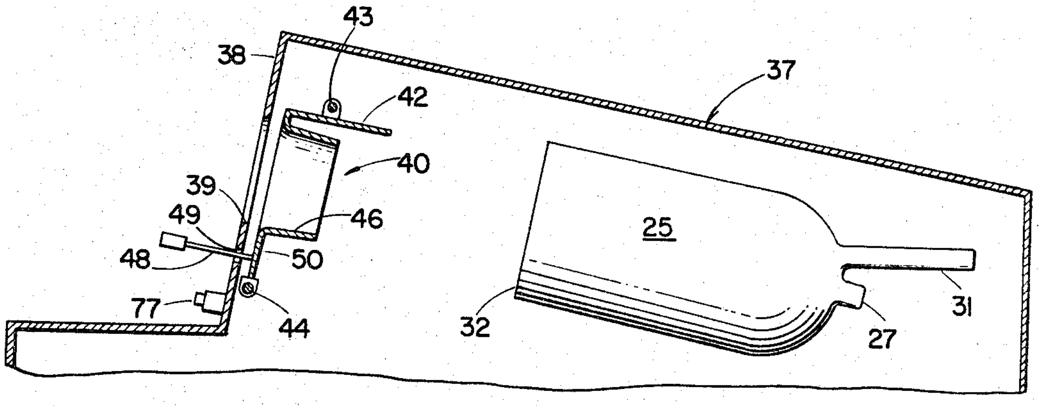
FIG. 2 is a fragmentary view of the apparatus of FIG. 1 arranged for direct viewing of the storage tube.
Figure 3:
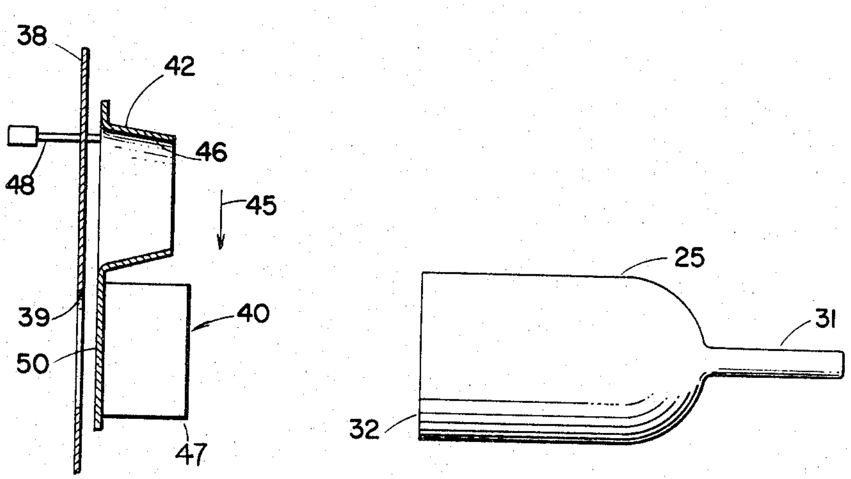
FIG. 3 is a fragmentary view taken along the line 3—3 of FIG. 1.

Referring now to FIGS. 2 and 3 in addition to FIG. 1, storage tube 25 along with receiving and control circuitry 26 and the electrostatic printing apparatus 36, to be hereinafter described, is suitably mounted within a housing 37. Housing 37 is provided with a front panel 38 having a viewing window 39 therein. Display tube 25 is mounted so that its display screen 32 may be directly viewed through window 39, as will be hereinafter more fully described. In the embodiment shown in FIGS. 1, 2 and 3, either a visual display on the storage tube 25 may be utilized or multiple electrostatic prints may be made by the electrostatic printing apparatus 36.

In order to provide for alternative direct optical viewing or electrostatic printing, a mirror assembly 40 is provided comprising a frame 42 mounted for sliding movement on guide rods 43, 44 in a direction transverse to the longitudinal axis of storage tube 25, as shown by the arrow 45 in FIG. 3. Frame 42 has a viewing window 46 therein at one side thereof, and an inclined mirror 47 mounted thereon on the other side thereof. Mirror assembly 40 is transversely movable on guide rods 43, 44 by means of a manually actuated lever 48 extending outwardly through slot 49 in the front panel 38 of housing 37. Mirror assembly 40 is thus transversely movable from a first position, as shown in FIG. 2, in which window 46 is in alignment with window 39 and display screen 32 of storage tube 25, thus permitting display screen 32 to be directly optically viewed through windows 39, 46, to a second position, as shown in FIGS. 1 and 3, in which mirror 47 is in alignment with display screen 32 of storage tube 25 and the view of display screen 32 through window 39 in front panel 38 is thus blocked by front portion 50 of frame 42. Inclined mirror 47, when in its printing position as shown in FIGS. 1 and 3, is in the field of view of display screen 32 of storage tube 25 and thus reflects the displayed optical image on display screen 32 downwardly onto printing platen 52 of electrostatic printer 36, as shown by the dashed lines 53, 54. A suitable optical lens 55 may be provided in the path of the light image reflected by mirror 47 in order properly to focus the reflected image onto printing platen 52.

In this embodiment, the electrostatic printing paper 56, which is coated with a layer of photoconductive material, such as zinc oxide, on one side thereof, is in elongated sheet form on a supply roll 57 mounted for rotation within housing 37, as shown in FIG. 1. A main drive motor 58 is provided coupled to drive input feed rollers 59 through a suitable drive clutch 60. Main drive 58 is also coupled to drive suitable platen belts 62 through a suitable platen clutch 66, and to drive other feed rollers shown at 63, 64, 65. Printing platen 52 includes a suitable vacuum box 67 adapted to be connected to a suitable vacuum pump or blower 68 (FIG. 4) by a suitable vacuum line 69.

A solenoid-actuated paper cutter 70 is disposed between the feed rolls 59 and the platen belts 62 and a suitable corona charger 72 is positioned between cutter 70 and the platen belts 62. It will now be seen that energization of main drive motor 58 and actuation of clutch 60 will cause feed rolls 59 to withdraw the electrostatic paper from the supply roll 57 in the direction shown by the arrow 73 and to advance the leading end of the paper through the paper cutter 70 and the corona charger 72 onto the platen belts 62. As will be hereinafter more fully described, an electrostatic charge is placed on the paper as it is advanced through the corona charger 72, and the cutter 70 is actuated to sever a sheet of paper of predetermined desired length for one hard copy print from the elongated sheet 56. Energization of main drive motor 58 and actuation of platen clutch 66 will cause the platen belts 62 to move the severed and charged sheet into printing position on platen 52. As will hereinafter be described, actuation of the platen belts 62 is interrupted and the severed and charged sheet is held flat in the printing position on platen 52 for exposure to the image 54 reflected by mirror 47 by the application of vacuum to the vacuum printing box 67.

As will also be hereinafter more fully described, the display of the output optical image on display screen 32 of storage tube 25 is interrupted when mirror 47 is moved to its printing position and while the printing paper is being advanced to the printing position on platen 52, display of the optical image being resumed when the severed charged sheet of printing paper is properly positioned on the printing platen 52. It will be readily understood that exposure of the charged electrostatic paper to the reflected optical image 54 will result in the provision of a latent charge image on the printing paper corresponding to the optical image.

Conventional toner applying apparatus 73 and fusing and developing apparatus 74 is sequentially arranged between the drive rolls 64, 65. As will hereinafter be described, after the severed charged sheet has been exposed on the printing platen 52 to the reflected optical image 54 for a sufficient length of time, display of the optical image by the storage tube 25 is again interrupted and the platen clutch 66 is again actuated to advance the severed sheet with the latent charge image thereon through the toner and fuser apparatus 73, 74 which tones and fixes the latent image to provide a visible image. The resultant hard copy 75 of the optical image appearing on the display screen 32 of the storage tube 25 is then deposited in a suitable receptacle 76 in the housing 37. As will hereinafter be described, the number of copies desired is selected by multiple copy switch 77 on the front panel 38.

It will now be readily understood that with the mirror assembly 40 in its viewing position as shown in FIG. 2, a single frame video signal transmitted from the camera station 10 is received at the receiving station 11 and written onto the storage screen 29 of the storage tube 25 by writing gun 31, either as direct black on white video, or inverted white on black video, as is well known to those skilled in the art. Flood gun 27 may either be turned on so that the progressive picture formation can be viewed, or turned off until the complete frame has been written into storage. When the complete single frame has been written into storage in the storage tube 25, transmission from the camera station 10 to the receiving station 11 is completed and the unit is then off-line until transmission of the next frame.

Referring now again additionally to FIG. 4, when one or more prints are desired, lever 48 is moved from the position shown in solid lines in FIG. 4, to the position shown in dotted lines 48a thereby to move mirror 47 to its printing position, as shown in FIGS. 1 and 3, to reflect the output optical image from display screen 32 of storage tube 25 onto the printing platen 52. Lever 48 in its printing position 48a closes switch S–1. Lever 48 is held in its printing position 48a by means of a suitable latch 78. Latch 78 is released by energization of unlatch coil 79 when the desired number of copies have been printed thus permitting lever 48 and mirror assembly 40 to be returned to their direct viewing position under the influence of a suitable spring 80. Return of lever 48 to its direct viewing position opens switch S–1.

Multiple copy switch 77 is manually actuated to select the desired number of copies, shown as being up to and including ten copies in the present embodiment. Multiple copy switch 77 comprises a switch arm 82 which is advanced away from zero position to a position corresponding to the number of copies desired, such as eight, as shown by the dashed line 82a. Switch arm 82 is sequentially returned toward its zero position by successive energizations of count solenoid coil 83. Control power, such as 120 volts, 60 cycle, single phase alternating current, is supplied from an external source (not shown) by lines 84, 85. Feeler switches S–4 and S–6 are respectively disposed in the path of paper movement between toner apparatus 73 and fuser and developer apparatus 74, and between fuser and developer 74 and hard copy print receptacle 76, feeler switches S–4 and S–6 being respectively closed responsive to the movement of a print thereby. Feeler switches S–4 and S–6 are connected in parallel and respectively connect count solenoid 83, fuser and developer 74, and an operating coil 86 of relay K–2 across lines 84, 85, as shown. Thus, each time a severed sheet reaches feeler switch S–4, count solenoid 83, fuser and developer 74 and operating coil 86 of relay K–2 will be energized. Each energization of count solenoid 83 will return switch arm 82 of multiple copy switch 77 one step toward its zero position. Feeler switch S–6 is contacted by the advancing completed print as it leaves fuser and developer 74 before the same print departs from feeler switch S–4 and thus fuser and developer 74 remains energized for a sufficient length of time to complete fixing the image on the print. It will thus be seen that despite the fact that both feeler switches S–4 and S–6 are coupled in parallel to energize count solenoid 83, each completed print will result in only a single energization of the count solenoid 83 and of operating coil 86 of relay K–2.

Switch S–1 when closed in response to movement of lever 48 to its printing position 48a couples main drive motor 58 and vacuum blower motor 68 for energization across lines 84, 85 through contacts K2–1 of relay K–2 in their normal or de-energized position 87. Thus, main drive motor 58 and vacuum blower motor 68 are energized as soon as a print is called for. Feeler switch S–2 is moved from its normal position 88 to its actuated position 89 in response to engagement with the leading end of the paper 56 withdrawn from supply roll 57, feeler switch S–2 being spaced a distance from cutter 70 equal to the desired length of the individual sheets of paper to be cut by the cutter 70. Feeler switch S–3 is moved from its normal position 90 to its actuated position 92 by engagement with the leading edge of the severed charged sheet of printing paper, feeler switch S–3 being located to sense when the severed, charged sheet of paper is properly positioned on printing platen 52. Closing of switch S–1 in response to movement of the lever 48 to its printing position 48*a* thus couples the input drive clutch 60 for energization across lines 84, 85 through feeler switch S–3 in its normal position 90 and feeler switch S–2 in its normal position 88. Platen clutch 66 and operating coil 93 of relay K–3 are also coupled for energization across lines 84, 85 through switch S–1, feeler switch S–3 in its normal position 90, and contacts K1–2 of relay K–1 in their normal or de-energized position 94. Thus, movement of lever 48 to its printing position 48*a* causes energization of drive clutch 60 to couple feed rolls 59 to the drive motor 58 thus to cause withdrawal of sheet 56 of electrostatic printing paper from the supply roll 57.

When the leading edge of the sheet 56 of the printing paper reaches feeler switch S–2, thus indicating that the desired length of the paper has been advanced past cutter 70, switch S–2 is actuated to its position 89 thus de-energizing the input drive clutch 60 stopping the feed rolls 59 and terminating withdrawal of sheet 56 of electrostatic printing paper from the supply roll 57. Actuation of feeler switch S–2 to its position 89 by the leading edge of the sheet 56 of electrostatic printing paper couples operating coil 95 of relay K–4 for energization across lines 84, 85 through switch S–1 and feeler switch S–3 in its normal position 90, operating coil 95 of relay K–4 being also coupled in a pulse circuit comprising diode 96, resistors 97, 98, 99 and 100, and capacitors 102, 104. Coupling of operating coil 95 of relay K–4 for energization across lines 84, 85, as above-described, thus applies a single pulse to operating coil 95 thereby momentarily closing its contacts K4–1, in turn momentarily to energize solenoid 105 of cutter 70 to actuate the same to sever the length of printing paper, as measured by the location of the feeler switch S–2, from the sheet 56.

It will be observed that the platen clutch 66 has been energized, as above-described, through switch S–1, feeler switch S–3 in its normal position 90, and relay contacts K1–2 in their de-energized position 94, thereby coupling the platen belts 62 to the main drive motor 58 so as to move the severed charged sheet of electrostatic printing paper onto the platen 52. Operating coil 93 of relay K–3 is energized simultaneously with platen clutch 66. Contacts K3–1 of relay K–3 are coupled in series with lead 106 which couples display screen 32 of storage tube 25 to high voltage source 107, energization of operating coil 93 of relay K–3 opening contacts K3–1 so as to disconnect the high voltage from the display screen, thus interrupting display of the output optical image. Thus, it is seen that immediately upon movement of lever 48 to its printing position 48*a* with resultant closing of switch S–1, relay contacts K3–1 are opened to interrupt display of the optical image on the display screen 32.

When the severed and charged sheet of printing paper reaches feeler switch S–3, the leading edge actuates switch S–3 to its second position 92, thus breaking the energizing connection to the charger 72 through the switch S–5 in its position 106 and breaking the energizing connection to platen clutch 66 and operating coil 93 of relay K–3 through relay contact K1–2 in its position 94. Platen clutch 66 is thus de-energized to stop the platen belts 62 and thus interrupt movement of the sheet of electrostatic printing paper so that the sheet is held in printing position in platen 52 by the vacuum applied to the vacuum box 67. De-energization of operating coil 93 of relay K–3 causes its contacts K3–1 to return to their normally closed positions thus connecting display screen 32 of storage tube 25 to the high voltage source 107. With the flood gun 27 having been previously turned on during or at the conclusion of the transmission of the single frame video signal by the receiving and control circuitry 26, turned off at actuation of lever 48, passage of the flood beam through the storage screen assembly 28 will resume thereby to produce the output optical image on the display screen 32, which, in turn, is reflected by mirror 47 downwardly through lens 55 onto the electrostatic printing paper on the platen 52.

Movement of feeler switch S–3 to its actuated position 92 couples timer motor 111 for energization across lines 84, 85 through switch S–1 and relay contacts K1–1 in their normal, i.e., de-energized position 108. Edge exposure lamps 109 are desirably provided to illuminate and thus expose the peripheral edges of the sheet of electrostatic printing paper on platen 52, thereby to eliminate a black border on the finished hard copy, and these lamps are also energized through feeler switch S–3 in its actuated position 92 and relay contact K1–1 in its de-energized position 108. At the end of the desired exposure interval, for example thirty seconds, timer motor 111 momentarily closes its contacts T thereby coupling operating coil 110 of relay K–1 for energization across lines 84, 85. Energization of operating coil 110 causes relay K–1 to move its contacts K1–1 to their energized position 112 thereby sealing-in operating coil 110 for energization through switch S–1, feeler switch S–3 in its actuated position 92, and contacts K1–1 in their energized position 112, despite subsequent opening of contacts T by the timer motor 111 at the end of its cycle of operation. Energization of operating coil 110 to relay K–1 moves its contacts K1–2 to their energized position 113 thus again connecting platen clutch 66 and operating coil 93 of relay K–3 for energization across lines 84, 85. Energization of relay K–3 again opens its contacts K3–1 to disconnected display screen 32 of the storage tube 25 from high voltage source 107 thus to interrupt the display of the optical image and energization of platen clutch 66 again couples main drive motor 58 to the platen belt 62 thereby advancing the severed sheet of paper, which now has a latent electrostatic charge image thereon, off of the platen 52 to the toner apparatus 73.

Assuming now that the multiple copy switch 77 has been moved to position 114 to call for one copy, when the leading edge of the sheet of electrostatic printing paper which is now passed through the toner apparatus 73 engages feeler switch S–4, this switch will be closed coupling the count solenoid 83, the fuser and developer apparatus 74, and the operating coil 86 of relay K–2 across lines 84, 85 for energization. Energization of count solenoid 83 will move switch arm 82 of multiple copy switch 77 to its zero position 115 thus connecting unlatch solenoid 79 for energization through the closed switch contacts S–4, in turn releasing latch 78 and permitting lever 48 to return to its normal position and opening switch S–1. Energization of operating coil 86 of relay K–2 will, however, move its contacts K2–1 to their energized position 116 so that the main drive motor 58 remains energized, thereby to continue to drive feed rolls 63, 64, 65 to advance the sheet of electrostatic printing paper through fuser and developer 74 and finally to discharge the finished hard copy 75 into receptacle 76. As previously stated, the leading edge of the finished hard copy engages feeler switch S–6 before the trailing edge departs from feeler switch S–4, and thus switch S–6 is closed before switch S–4 is opened, thus maintaining energization of fuser and developer 74 and operating coil 86 of relay K–2. When the trailing edge of finished hard copy 75 departs from feeler switch S–6, that switch is opened thus de-energizing fuser and developer 74 and operating coil 86 of relay K–2, thus in turn moving its contacts K2–1 to their de-energized position 87 to break the energizing connection to the blower motor 68 and the main drive motor 58, switch S–1 having previously been opened as above-described.

Assuming now that multiple copy switch 77 has been moved to call for a number of copies, such as being moved to position 117 to call for eight copies, when the leading edge of the first sheet of electrostatic printing paper engages feeler switch S–4, that switch will close energizing count solenoid 83, fuser and developer 74, and operating coil 86 of relay K–2, as abovedescribed. This single energization of count solenoid 83 will, however, only advance switch arm 82 of multiple copy switch 77 one step toward its zero position 115, i.e., only to position 116 so that the latch solenoid 79 is not at this point energized.

When the leading edge of the sheet of electrostatic printing papaper engages feeler switch S–5, that switch will be actuated to its position 119 thereby again connecting charger 72 across lines 84, 85 for energization. It will be observed that switch S–1 has not been opened in response to energization of count solenoid 83; however, switch S–3 will be returned to its normal position 90 when the trailing edge of the sheet of electrostatic printing paper departs therefrom as it is advanced through the toner apparatus 73 toward the fuser and developer apparatus 74. The feeler switch S–2 has previously been restored to its normal position 88 as the trailing edge of the sheet of electrostatic printing paper departed from the platen 52, and thus input drive clutch 60 is again energized through switch S–1, and feeler switches S–3 and S–2 again to initiate withdrawal of paper 56 from supply roll 57 thereby to initiate printing of the second of the eight copies called for by multiple copy switch 77, prior to completion of toning and fixing of the first copy and its discharge into receptacle 76. When the trailing edge of the first copy departs from feeler switch S–6, that switch is opened to de-energize count solenoid 83, fuser and developer apparatus 74, and operating coil 86 of relay K–2, thereby restoring contacts K2–1 to their deenergized position 87 so that the blower motor 68 and main drive motor 58 are again energized through switch S–1, and the operation then continues in a manner identical to that previously described.

It will readily be seen that as each successive copy engages feeler switch S–4, that switch will be closed to energize count solenoid 83 which in turn will advance switch arm 82 of multiple copy switch 77 one step, switch arm 82 in this fashion finally reaching its zero position 115 in response to the eighth copy reaching feeler switch S–4 and the apparatus will then be automatically turned off but in a condition immediately to begin to make new copies of a different display as soon as the last copy departs from feeler switch S–6, as above-described.

It will be observed that in the embodiment of FIGS. 1 to 4, inclusive, the output optical image on the display screen 32 of storage tube 25 may be visually observed only when hard copies are not being made. There are applications, however, when it is desirable to observe the display on the storage tube 25 while hard copies are being made, and it may further be desirable to provide for observation of the display at a location remote from that of the hard copy printing apparatus. Referring now to FIGS. 5 through 8, inclusive, another embodiment of the receiving station of the invention is shown incorporating a closed circuit television camera and cathode ray tube monitor so that the display on the storage tube 25 can be observed before, during and/or after the printing cycle.

In this embodiment, the same camera station 10, transmission facility 24, receiving and control circuitry 26 and storage display tube 25 are employed as in the embodiment of FIG. 1. In order to provide for viewing of the display on display screen 32 of storage tube 25 during the printing cycle, a part-silvered or fractioning mirror 120 is provided which, in a specific embodiment, has a twenty percent light transmission directly therethrough, as shown by the dashed lines 122, and an eighty percent light transmission by reflection, as shown by the dashed lines 123. Light transmission 123 is reflected through a suitable focusing lens 124 onto another mirror 125, which in turn reflects the image onto the printing platen 52. A mechanical shutter 127 actuated by a suitable solenoid 128 is disposed in the path of the reflected light 123, as will be hereinafter more fully described.

Another mirror 129 receives the light image 122 transmitted directly through the part-silvered mirror 120 and reflects the same onto a suitable closed circuit television camera tube 130, as shown by the dashed lines 132. A suitable optical lens may be disposed in the path of the light image 132, as is well known to those skilled in the art. Closed circuit television camera tube 130 is coupled in any suitable fashion, as by coaxial cable 133, to a conventional cathode ray tube monitor 134, which thus continuously displays the optical output image which is displayed on the display screen 132 of the storage tube 25.

The electrostatic printing paper 56 in elongated sheet form is again supplied from a supply roll 57 and is withdrawn from roll 57 by feed rolls 59 coupled by input clutch 60 to main drive motor 58. A rotary cutter 135 is employed in this embodiment driven by the main drive motor 58 through cutter brake 136. Corona charge 72 is again disposed between the cutter 135 and the printing platen 52. As in the previous embodiment, printing platen 52 includes a vacuum box 67 connected by vacuum line 69 to the vacuum blower motor 68.

Figure 6:
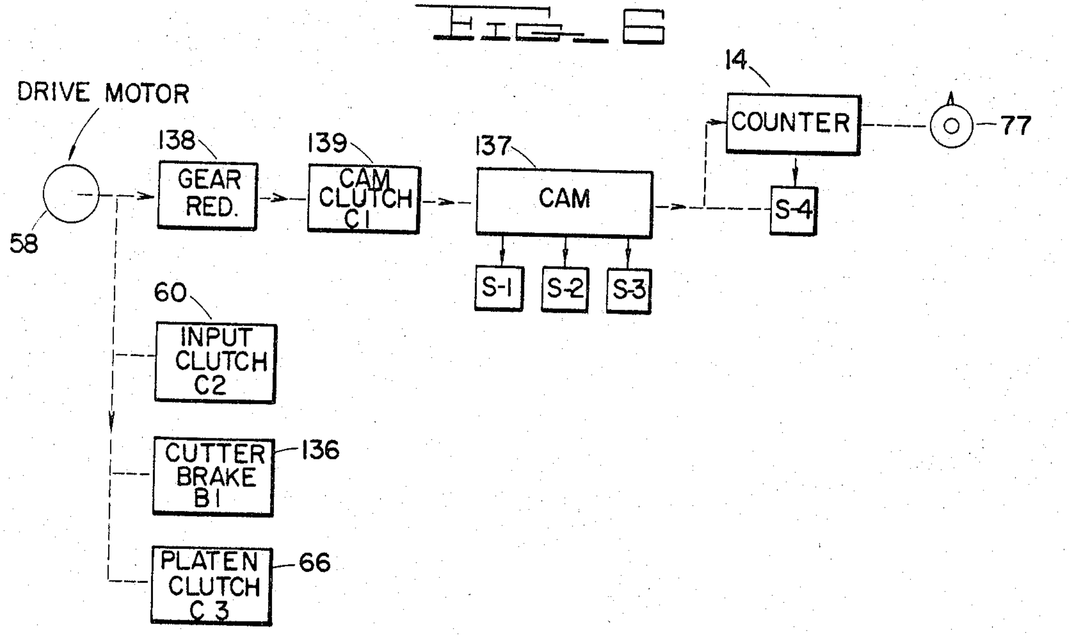
FIG. 6 is a schematic diagram of the mechanical drive mechanism of the apparatus of FIG. 5.
Figure 7:
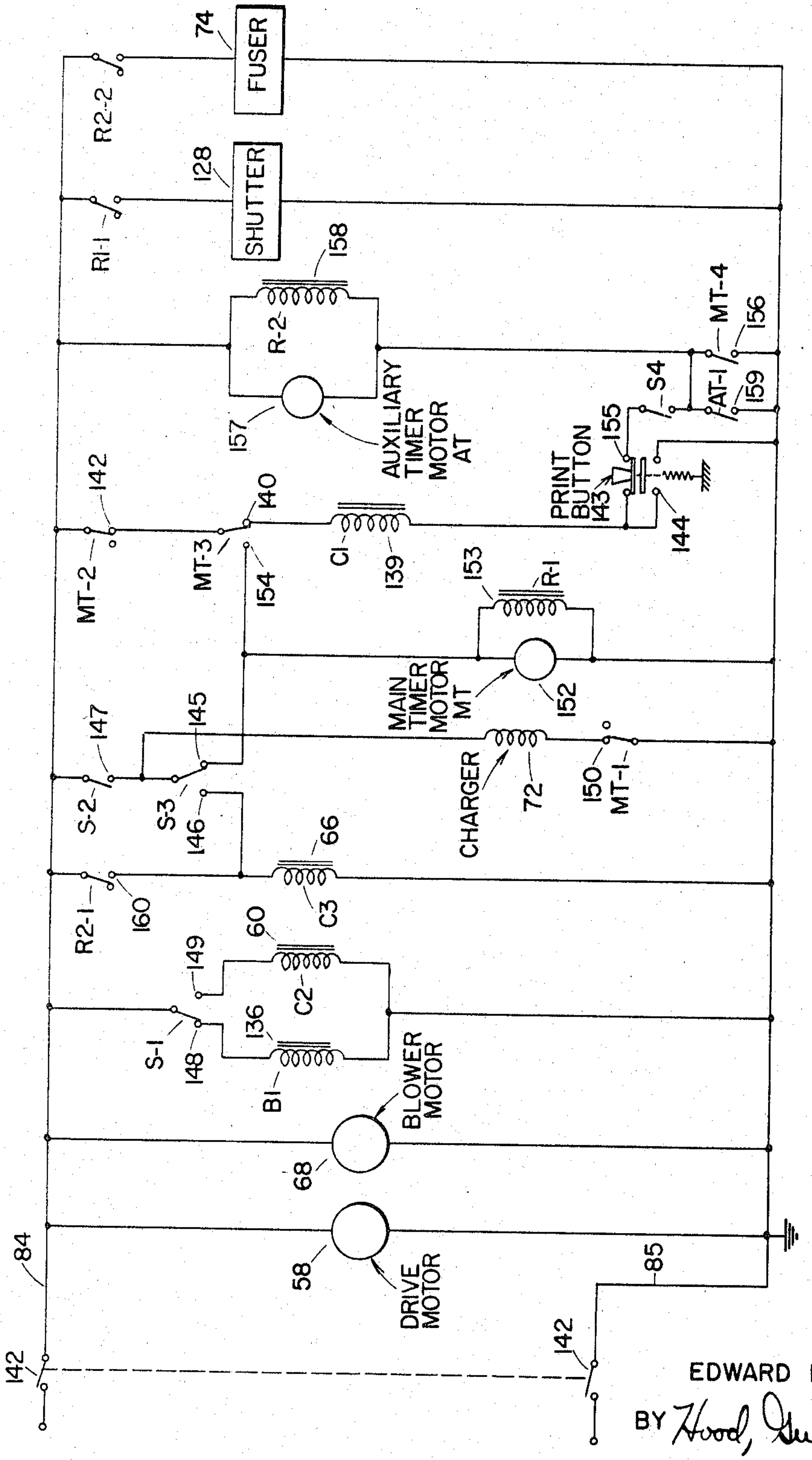
FIG. 7 is a schematic diagram of the control circuitry of the apparatus of FIGS. 5 and 6.

Referring additionally to FIGS. 6 and 7, in this embodiment main drive motor 58 drives a suitable timing cam assembly 137 one revolution through a suitable gear reduction 138 in response to each energization of cam clutch 139. Switches S–1, S–2, and S–3 are respectively actuated by the cam assembly 137 at appropriate times, as will be hereinafter more fully described. As will further be more fully described, cam assembly 137 actuates switch S–4 and drive revolution counter 140 which counts-down the revolutions of cam assembly 137 to zero from a predetermined number as selected by the multiple copy selector 77.

Figure 8:
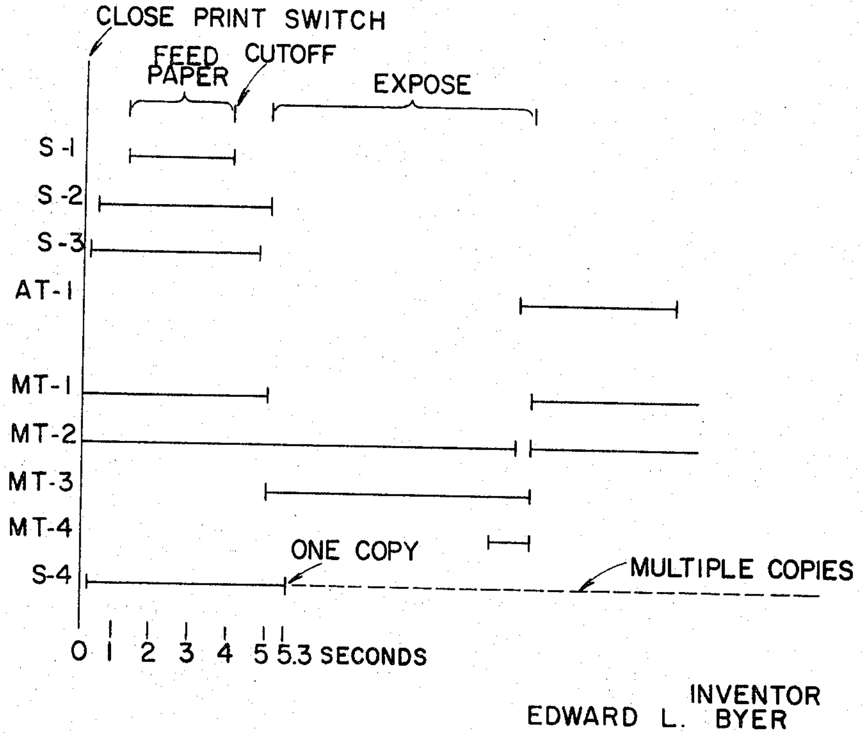
FIG. 8 is a timing diagram of the apparatus of FIGS. 5, 6 and 7.

In this embodiment, control lines 84, 85 are coupled to a suitable source of control power, such as 120 volts, 60 cycle, single phase alternating current by line switches 142, and main drive motor 58 and blower motor 68 are permanently connected for energization across lines 84, 85. A printing cycle is initiated by manual actuation of printing button 143 to close its contacts 144 thereby coupling cam clutch 139 for energization across lines 84, 85 through main timer contacts MT–3 in their normal position 140 and main timer contacts MT–2 in their normal position 142. Referring additionally to FIG. 8, momentary energization of cam clutch 139 in response to actuation of printing button 143 couples cam assembly 137 to the gear reduction 138 so as to drive the cam assembly 137 through one revolution. In a specific embodiment of the invention, cam assembly 137 completes one revolution in 5.3 seconds. It will be observed that in the specific embodiment, switch S–3 is actuated at approximately .3 second from its normal position 145 to its actuated position 146, and that at approximately .4 second switch S–2 is actuated from its normally open position to its closed position 147 thus coupling platen clutch 66 for energization through switches S–2 and S–3, thereby to drive the platen belts 62 to clear any sheet of electrostatic printing paper which may be on the printing platen 52.

Switch S–1 in its normal position 148 couples the cutter brake coil 136 for energization across lines 84, 85. At approximately 1.3 seconds in the specific embodiment, switch S–1 is actuated to its position 149 thus coupling the input clutch 60 for energization across lines 84, 85 thereby to drive the feed rolls 59 to withdraw sheet 56 of electrostatic printing paper from the supply roll 57. At approximately 3.57 seconds, during which time the desired length of printing paper has been withdrawn by the feed rolls 59, switch S–1 is de-actuated to its normal position 148 thus de-energizing input clutch 60 to terminate withdrawal of the electrostatic printing paper 56 from supply roll 57, and to energize cutter brake 136 to cause the cutter 135 to cut-off the sheet of electrostatic printing paper at the desired length. It will be observed that closing of switch S–2 couples the corona charger 72 for energization across lines 84, 85 through the main timer contacts MT–1 in their normal position 150, and thus that the charger 72 is energized thereby charging the electrostatic printing paper as it is being withdrawn from the supply roll 57 by the feed rolls 59.

At approximately 4.9 seconds in the specific embodiment, cam assembly 139 actuates switch S–3 to its normal position 145, the severed and charged sheet of electrostatic printing paper having in that interval reached proper position on the printing platen 52, thereby de-energizing platen clutch 66 to stop the platen belts 62 and to hold the severed and charged sheet of paper in printing position. With switch S–2 still actuated to its closed position 147, actuation of switch S–3 to its position 145 couples the main timer motor 152 and operating coil 153 of relay R–1 for energization across lines 84, 85. Shutter 127 is normally disposed in the path of reflected light 123 thus blocking the reflected light from the printing platen 52. Energization of operating coil 153 of relay R–1 closes its contacts R1–1 thereby coupling the shutter solenoid 128 for energization across lines 84, 85, thus moving the shutter 127 out of the path of the reflected light 123 so that the optical image from the display screen 32 of storage tube 25 is reflected onto the severed, charged sheet of electrostatic printing paper now held on the printing platen 52 to expose the same.

As soon as the main timer motor 152 starts, it actuates its contacts MT–3 from their normal position 140 to their actuated position 154, thus coupling the main timer motor 152 and operating coil 153 of relay R–1 for energization through main timer contacts MT–2 and MT–3 so that the main timer motor and operating coil 153 remain energized despite subsequent opening of contacts S–2 at approximately 5.1 seconds in the specific embodiment. Main timer motor 152 provides the exposure interval which in the specific embodiment is forty to fifty seconds. Main timer contacts MT–1 open when the main timer motor 152 starts, thus de-energizing charger 72, contacts MT–1 closing again at the end of one exposure cycle provided by the main timer motor 152. It will be observed that upon release of the printing button 143, its contacts 155 are closed. Contacts S–4 are closed immediately upon the start of rotation of the cam assembly 137 and are opened by counter 140 when the counter has counted-down to zero.

Close to the end of the exposure cycle as determined by main timer motor 152, .75 second in the specific embodiment, main timer contacts MT–4 are closed to position 156 thus coupling auxiliary timer motor 157 and operating coil 158 of relay R–2 across lines 84, 85 for energization. Main timer contacts MT–2 are opened momentarily at the end of the exposure interval, the timer motor 152 coasting to the end of its cycle at which point main timer contacts MT–3 are actuated to their normal position 140 and main timer contacts MT–1 are actuated to their normally closed position 150. After closing of the main timer contacts MT–4 and prior to the reopening of those contacts at the end of the exposure interval, auxiliary timer contacts AT–1 are closed to position 159, approximately .5 second before the end of the exposure interval in the specific embodiment, thus sealing-in the auxiliary timer motor 157 and operating coil 158 of relay R–2. Opening of main timer contacts MT–2 at the end of the exposure interval not only de-energizes the main timer motor 152, but also operating coil 153 of relay R–1, thus opening contacts R1–1 to de-energize shutter solenoid 128 and in turn to return shutter 127 to its normal position cutting-off the reflected light image 123. Main timer contacts MT–4 also open at the end of the exposure interval; however, as indicated, auxiliary timer contacts AT–1 have by then closed to seal-in auxiliary timer motor 157 and operating coil 158 of relay R–2.

Energization of operating coil 158 of relay R–2 closes its contacts R2–1 to position 160 thus again coupling platen clutch 66 for energization across lines 84, 85, thus actuating the platen belts 62 to move the sheet of electrostatic printing paper with the latent charge image now thereon off of the platen 52. Contacts R2–2 of relay R–2 are closed responsive to energization of operating coil 158 thereby coupling the fuser 74 for energization across lines 84, 85.

Assuming now that the multiple copy selector 77 has been set for one copy thereby setting counter 140 to count-down from one, completion of one revolution of the cam assembly 137 will restore counter 140 to zero thus opening switch S–4. Auxiliary timer motor 157 is, however, energized through its contacts AT–1 which open after a sufficient interval to permit the sheet of electrostatic printing paper having the latent charge image thereon to be advanced through the toner apparatus 73 and the fuser apparatus 74 by means of the feed rolls 63, 64, 65 for toning and fixing and to discharge the resultant hard copy 75. In the specific embodiment, auxiliary timer contacts AT–1 are opened at approximately 7.5 seconds following initial energization of the auxiliary timer motor 157.

Assuming now that multiple copy selector 77 has been set for multiple copies, for example eight, counter 140 will thus be set to count-down from eight to zero, and thus switch S–4 will not be opened by counter 140 until eight full revolutions of the cam assembly 137. In this condition, when the main timer contacts MT–2 are closed following their momentary opening at the end of the first exposure interval, and with main timer contacts MT–3 at the end of the first exposure interval actuated to position 140, it will be observed that the cam clutch 139 will again be energized through main timer contacts MT–2, main timer contacts MT–3, printing button contacts 155, switch S–4, and auxiliary timer contacts AT–1 which, it will be observed, were closed by energization of the auxiliary timer motor 157 prior to the end of the first exposure interval. Thus, a new printing cycle is initiated by another revolution of cam assembly 137 and sequential actuation of switches S–3, S–2 and S–1, as above described, while the first copy is being moved off of the printing platen 52 and through the toner apparatus 73 and fuser apparatus 74. This sequence of operations will then continue until the counter 140 has counted-down to zero thus opening the switch S–4 at the end of the last revolution of cam assembly 137 corresponding to the number of copies selected by the multiple copy selector 77.

It will now be seen that with both embodiments of the present invention, the single frame video signal is written into storage in the storage tube 25, and that the equipment is thereafter off-line permitting subsequent viewing of the image displayed out of storage and/or the making of one or more hard copies as desired. It will readily be seen that during this subsequent off-line period, the camera apparatus and/or transmission facility may be utilized for other purposes. It will, however, be readily apparent that two storage display tubes may be incorporated at the receiving station so that a new single frame picture may be written into one storage tube while hard copies of the picture previously written into the other storage tube are being printed, or while the previously stored image is being remotely displayed.

While there have been described above the principles of this invention in connection with specific apparatus, it is to be clearly understood that this description is made only by way of example and not as a limitation to the scope of this invention.

What is claimed is:

1. In a system adapted to transmit for a short duration signals representing an image of a still picture, a receiving station for receiving said signals comprising a cathode ray tube having storage means and a display screen for converting said signals into a stored optical image for display on said screen for a period many times longer than the transmission time of said signals, means for moving a sheet of optical image-sensitive material in view of said display screen, means for selectively interrupting said image display and the movement of said sheet, and means for printing a plurality of copies of the same said optical image on said sheet during successive interruptions of said movement.

2. A system according to claim 1 further comprising optical means for coupling said displayed optical image to said printing means.

3. In a television system for transmitting an image of a still picture having camera tube means and means for selectively actuating the same to generate a video signal in response to an input optical image, a receiving station for receiving said video signal comprising, means including a cathode ray tube having a display screen and storage means for converting said video signal into a stored electrical signal and then into an optical image independent of said video signal and displaying said optical image for a predetermined time wherein the transmission time of said image is short compared with the time in which said optical image is displayed on said cathods ray tube, means for direct optical viewing of said display screen, means for moving a sheet of optical image-sensitive material in view of said screen, means for selectively interrupting said image display and the movement of said sheet, and means for printing a plurality of copies of the same said optical image on said sheet during successive interruptions of said movement.

4. In a television system for transmitting still images having camera tube means and means for selectively actuating the same to generate a video signal in response to an input optical image: a receiving station comprising means for receiving said video signal; direct viewing storage cathode ray tube means coupled to said receiving means and having storage means and display screen means for converting said video signal into a still output optical image and displaying the same for a predetermined time; means for direct optical viewing of said optical image; means for moving a sheet of optical image-sensitive material from a first location to a third location through a second location intermediate said first and third locations in view of said output optical image; means for interrupting said output optical image during movement of said sheet; means for interrupting movement of said sheet at said second location for a predetermined time during which said output optical image is projected onto said sheet to provide a latent image thereon corresponding to said output optical image; and means for developing said latent image to render the same visible thereby providing a hard copy of said output optical image.

5. The system of claim 4 wherein said developing means is at said third location.

6. The system of claim 4 wherein said image interrupting means comprises means for electrically disabling said cathode ray tube thereby to interrupt the display of said output optical image.

7. The system of claim 4 wherein said image interrupting means comprises selectively actuable shutter means disposed in the optical path between said display screen means and said second location.

8. The system of claim 4 wherein said moving means includes means adjacent said first location for severing said sheet in a predetermined length from a supply of said material in elongated form.

9. The system of claim 4 further comprising means at said second location for maintaining said sheet flat during exposure to said output optical image.

10. The system of claim 4 wherein said sheet is formed of electrostatically chargeable material, and further comprising means adjacent said first location for placing an electrostatic charge on said sheet whereby said latent image is an electrostatic image, and wherein said developing means is adjacent said third location and includes means for toning and fixing said electrostatic image.

11. The system of claim 4 further comprising reflecting means disposed in the field of view of said display screen means for reflecting said output optical image onto said second location.

12. The system of clam 4 further comprising reflecting means selectively movable between first and second positions, said reflecting means in said first position being out of the direct field of view of said display screen means whereby said display screen means and said output optical image may be directly optically viewed, said reflecting means in said second position thereof being disposed in the direct field of view of said display screen means and reflecting said output optical image onto said second location.

13. The system of claim 4 further comprising another camera tube means disposed to view said output optical image, and another cathode ray tube means coupled to said other camera tube means for monitoring said output optical image.

14. The system of claim 4 further comprising fractioning mirror means having a first predetermined light transmission directly therethrough and a second predetermined light transmission by reflection, said mirror means and second location being respectively disposed so that one of said light transmissions is received at said second location, another camera tube means disposed to receive the other of said light transmissions, and another cathode ray tube means coupled to said other camera tube means for monitoring said output optical image.

15. The system of claim 14 wherein said mirror means is disposed to reflect said second light transmission onto said second location and said other camera tube means is disposed to view said first light transmission.

16. In a television system for transmitting still images having camera tube means with line and frame scanning means and means for selectively actuating the same to generate a video signal for a single frame in response to a respective input optical image: a receiving station comprising means for receiving said single frame video signal; direct viewing storage cathode ray tube means coupled to said receiving means, said cathode ray tube means including line and frame scanning means, storage means and display screen means for converting said single frame video signal into a single still output optical image and displaying the same for a predetermined time following said single frame video signal; means for storing a supply of electrostatically chargeable material in elongated sheet form; selectively actuable means adjacent a first location for withdrawing said sheet from said storing means; selectively actuable means adjacent said first location for severing said elongated sheet to provide a sheet of predetermined length; means adjacent said first location for placing an electrostatic charge on the severed sheet; means at a second location for exposing the charged severed sheet to said output optical image whereby an electrostatic charge image is formed on said severed sheet corresponding to said output optical image; selectively actuable means for moving said severed sheet from said first location to a third location through said second location; means adjacent said third location for toning and fixing said charge image to render the same visible thereby providing a hard copy of said output optical image; and selectively actuable means for interrupting said output optical image during movement of the severed sheet into and out of said second location.

17. The system of claim 16 further comprising control means for automatically providing a cycle of operations for said receiving station and including manually actuated means for initiating said cycle, means for actuating said withdrawing means in response to actuation of said initiating means, first means for sensing withdrawal of said predetermined length of said sheet, means for de-actuating said withdrawing means and for actuating said severing means in response to said first sensing means, means for actuating said moving means in response to actuation of said initiating means thereby to move said severed charged sheet to said second location, means for actuating said interrupting means in response to actuation of said initiating means, second means for sensing positioning of said severed charged sheet at said second location, means for de-actuating said moving means in response to said second sensing means thereby to hold said severed charged sheet at said second location, means for de-actuating said interrupting means in response to said second sensing means thereby to expose said severed charged sheet to said output optical image, selectively actuable timing means for providing a predetermined exposure interval, means for actuating said timing means in response to said second sensing means thereby to initiate said exposure interval, and means for actuating said interrupting means and said moving means in response to said timing means at the end of said exposure interval thereby to interrupt said output optical image and to move said severed sheet with said electrostatic charge image thereon to said third location.

18. The system of claim 17 further comprising third means for sensing discharge of a severed sheet from said toning and fixing means, manually actuated means for selecting the number of hard copies to be provided, means for counting the number of hard copies in response to said third sensing means, and means for de-actuating said initiating means in response to said counting means counting a number of copies equal to the number selected by said selecting means.

19. The system of claim 16 further comprising control means for automatically providing a cycle of operations for said receiving station and including manually actuated means for initiating said cycle, power drive means, first timing means having a predetermined timing interval, means for coupling said first timing means to said drive means to be driven thereby in response to actuation of said initiating means, first means actuated by said first timing means for actuating said withdrawing means for a first predetermined time and for actuating said severing means at the end of said first time thereby to provide said severed sheet, second means actuated by said first timing means for actuating said charging means for a second predetermined time thereby to charge said severed sheet, third means actuated by said first timing means for actuating said moving means for a third predetermined time thereby to move said severed charged sheet to said second location, second selectively actuable timing means for providing a predetermined exposure interval, said third means actuating said second timing means at the end of said third time, means actuated by said second timing means for actuating said interrupting means to expose said charged severed sheet to said output optical image during said exposure interval, means actuated by said second timing means for de-actuating said coupling means at the beginning of said exposure interval, third selectively actuable timing means, means actuated by said second timing means at the end of said exposure interval for actuating said third timing means, means actuated by said third timing means for actuating said moving means for a fourth predetermined time thereby to move said severed sheet with said charge image thereon from said second to said third location, and means actuated by said third timing means for actuating said toning and fixing means for a fourth predetermined time.

20. The system of claim 19 further comprising manually actuated means for selecting the number of hard copies to be provided and including means coupled to said first timing means for counting the number of timing intervals provided thereby, and means actuated by said counting means for de-actuating said initiating means in response to said counting means counting a number of said cycles equal to the number of copies selected by said selecting means.

21. The system of claim 16 further comprising mirror means, manually actuated means for selectively moving said mirror means between first and second positions, said mirror means in said first position thereof being displaced from the direct field of view of said display screen means whereby said output optical image may be directly optically viewed, said mirror means in said second position thereof being disposed to reflect said output optical image onto said second location.

22. The system of claim 16 further comprising a fractioning silvered mirror having a first predetermined light transmission directly therethrough and a second predetermined light transmission by reflection, said mirror being disposed to reflect said output optical image onto said second location, another camera tube means disposed to view said output optical image transmitted directly through said mirror, and another cathode ray tube means coupled to said other camera tube means for monitoring said output optical image.

References Cited

UNITED STATES PATENTS 3,084,213 4/1963 Lemelson ---------- 178—6.7

ROBERT L. GRIFFIN, *Primary Examiner.*

HOWARD W. BRITTON, *Assistant Examiner.*